(12) United States Patent
French et al.

(10) Patent No.: US 7,360,419 B2
(45) Date of Patent: Apr. 22, 2008

(54) GRAVITY GRADIOMETER

(75) Inventors: John Barry French, Oakville (CA);
Kieran A. Carroll, Brampton (CA);
Steven J. Thorpe, Toronto (CA)

(73) Assignee: Gedex Inc., Mississauga, Ontario (CA)

(*) Notice: Subject to any disclaimer, the term of this patent is extended or adjusted under 35 U.S.C. 154(b) by 0 days.

(21) Appl. No.: 11/494,545

(22) Filed: Jul. 28, 2006

(65) Prior Publication Data

US 2007/0051175 A1    Mar. 8, 2007

Related U.S. Application Data

(60) Provisional application No. 60/703,502, filed on Jul. 29, 2005.

(51) Int. Cl.
*G01V 7/00* (2006.01)
*G01M 1/12* (2006.01)

(52) U.S. Cl. .................. 73/382 G; 73/382 R (58) Field of Classification Search ............ 73/382 R, 73/382 G, 510, 514.02, 514.17
See application file for complete search history.

(56) References Cited

U.S. PATENT DOCUMENTS

| | | | | | |
|---|---|---|---|---|---|
| 3,722,284 | A | * | 3/1973 | Weber et al. | 73/382 R |
| 4,215,578 | A | * | 8/1980 | Lautzenhiser | 73/382 G |
| 5,505,555 | A | * | 4/1996 | Van Kann et al. | 403/291 |
| 5,668,315 | A | * | 9/1997 | Van Kann et al. | 73/382 G |
| 5,804,722 | A | * | 9/1998 | Van Kann et al. | 73/382 G |
| 5,817,939 | A | * | 10/1998 | Lumley et al. | 73/382 R |
| 6,776,042 | B2 | * | 8/2004 | Pike et al. | 73/514.32 |

\* cited by examiner

*Primary Examiner*—Helen Kwok
(74) *Attorney, Agent, or Firm*—Bereskin and Parr (57) ABSTRACT

A gravity gradiometer having quadrupole responders in which a mass quadrupole is supported by a torsional spring forming a flexure allowing rotation of the mass quadrupole about its center of mass. The flexure can be a pair of spaced apart posts. The flexure can be made from glassy metal having at room temperature a high elastic limit, high stiffness, high strength and low internal damping. The flexure can alternatively be a web made of glassy metal.

46 Claims, 4 Drawing Sheets

GRAVITY GRADIOMETER

PRIOR APPLICATION

This application claims the benefit of U.S. Provisional Application Ser. No. 60/703,502 filed Jul. 29, 2005 entitled "GRAVITY GRADIOMETER".

FIELD OF THE INVENTION

This invention relates to a gravity gradiometer.

BACKGROUND OF THE INVENTION

Gravity gradiometers have existed for many years and are used to measure variations in the gradient of the earth's gravitational field. Gravity gradiometers may be used in exploration for minerals and hydrocarbons, since deposits of these things in the earth, and variations in the underground structure containing the deposits, produce variations in gravity and in the gravitational gradients which if interpreted correctly can lead to valuable discoveries. The ability to operate a gravity gradiometer in a moving vehicle is desirable, since doing so can greatly decrease the amount of time needed to carry out a survey of a given site.

The variations in the gravity gradients which must be measured are extremely small in magnitude and therefore require very sensitive, low noise instruments with very repeatable response characteristics. Moreover, when the gravity gradiometer is mounted in a moving vehicle, the signals due to these gravity gradient changes are very small in comparison to the undesirable responses of the instrument produced by accelerations of the vehicle on which the instrument is mounted.

The performance of present commercially operating airborne gravity gradiometers is currently limited to an error level of about 5 Eotvos (1 Eo=gradient of $10^{-9}$ meters per second squared per meter, approximately $10^{-10}$ g per meter) at a signal averaging time of 6 seconds. Although this performance has been sufficient to hint at the potential usefulness of airborne gravity gradiometry, improvement to a performance level of 1 Eo averaged once per second is believed to be required for widespread successful application in mineral exploration.

A known form of gradiometer which has the laboratory demonstrated potential to provide this performance gain is the so-called orthogonal quadrupole responder (also referred to here as an OQR, and also known as the cross-component gravity gradiometer). In the OQR, two orthogonally oriented balance beams (also referred to here as mass quadrupoles), each being a body of elastic material with a distributed mass including a mass quadrupole moment, are attached to a housing using torsional springs, thus comprising quadrupole responders (also sometimes called angular accelerometers). The balance beams rotate differentially (in opposite directions) in response to changes in gravity gradients, but rotate in common mode (both in the same direction) in response to rotational acceleration motions of the vehicle. Thus, in principle, the OQR separates the weak gravity gradient signals from the much larger noise due to vehicle motions.

Early versions of a rotating OQR design have been disclosed by Weber, Zipoy and Forward in U.S. Pat. No. 3,722,284 (cf. FIG. 10 and associated discussion), and by Robert L. Forward, "Future lunar gravity measurements," *Earth, Moon, and Planets*, Volume 22, No. 4 (1980) pp. 419-433, and by Lautzenhiser in U.S. Pat. No. 4,215,578. Ho Jung Paik, in "Superconducting tensor gravity gradiometer for satellite geodesy and inertial navigation," *The Journal of the Astronautical Sciences*, Volume XXIX, No. 1, pp. 1-18, January-March 1981, presented a description of a Cross Component Gradiometer (discussion on p. 7, and FIG. 4), which is topologically equivalent to Forward's design, but which utilizes superconducting materials, pancake coils and SQUID detectors in order to achieve stable operation without needing to rotate. A later version also employing superconductive materials is disclosed by Van Kann and Buckingham in U.S. Pat. No. 5,668,315, and is described as an OQR by Van Kann et al., "Laboratory tests of a mobile superconducting gravity gradiometer", *Physica B*, Volume 165 (1990) pp. 93-94. In Moody, Paik & Canavan, "Principle and performance of a superconducting angular accelerometer", *Review of Scientific Instruments*, Volume 74, Issue 3 (2003) pp. 1310-1318, details of a built and tested superconducting angular accelerometer are described, a pair of which can be used to form an OQR gravity gradiometer.

Existing examples of OQR gravity gradiometers make use of cryogenic temperatures, both to permit the use of SQUID (superconductive quantum interference device) based detection of the quadrupole responders' motion, and to achieve almost perfectly elastic behavior in the torsional springs on which the mass quadrupoles are mounted. Van Kann and Buckingham describe one such OQR gravity gradiometer in U.S. Pat. No. 5,668,315. Another version is described in Moody, M. V. and Paik, H. J., "A superconducting gravity gradiometer for inertial navigation", in *Proc. IEEE 2004 Position Location and Navigation Symposium (PLANS 2004)*, April 2004, pp. 775-781. At temperatures significantly above cryogenic temperatures, including standard room temperature, all polycrystalline materials exhibit creep and hysteresis effects which would degrade instrument response repeatability (which is why conventional gravity meters are constructed of amorphous fused quartz, which exhibits much lower creep and hysteresis).

Cryogenic temperatures may be achieved by placing a superconducting gravity gradiometer in a cryostat cooled using a supply of liquid helium or other means of cooling. The necessity for liquid helium supply in the field, and the weight, size, and complexities associated with the liquid helium cryostat are undesirable features. Moreover, OQR-type gravity gradiometers currently use torsional springs which are in the form of a "microscopically" thick web joining the balance beams to the base. These webs are fragile, especially at higher temperatures similar to room temperature, and are prone to breaking. In addition, it is difficult to achieve requisite dimensional tolerances when manufacturing that type of web flexure.

BRIEF SUMMARY OF THE INVENTION

Accordingly, it is an object of the present invention to provide improved OQR-type gravity gradiometers which have improved characteristics, and which in some embodiments can be operated without the need for cryogenic cooling.

In one aspect, the invention provides a quadrupole responder for an OQR-type gravity gradiometer comprising: a) a housing, b) a mass quadrupole positioned within the housing, c) a torsional spring comprising a flexure attaching said mass quadrupole to the housing and allowing rotation of the mass quadrupole about its center of mass, d) the flexure comprising at least two spaced apart posts.

In another aspect, the invention provides a quadrupole responder for an OQR-type gravity gradiometer comprising: a) a housing, b) a mass quadrupole positioned within the housing, c) a torsional spring comprising a flexure attaching said mass quadrupole to the housing and allowing rotation of the mass quadrupole about its center of mass, d) said flexure being formed of a glassy metal such that the flexure will undergo low loss elastic deformation during said rotation.

Further objects and advantages of the invention will appear from the following description, taken together with the accompanying drawings.

DETAILED DESCRIPTION OF PREFERRED EMBODIMENTS

Figure 1:
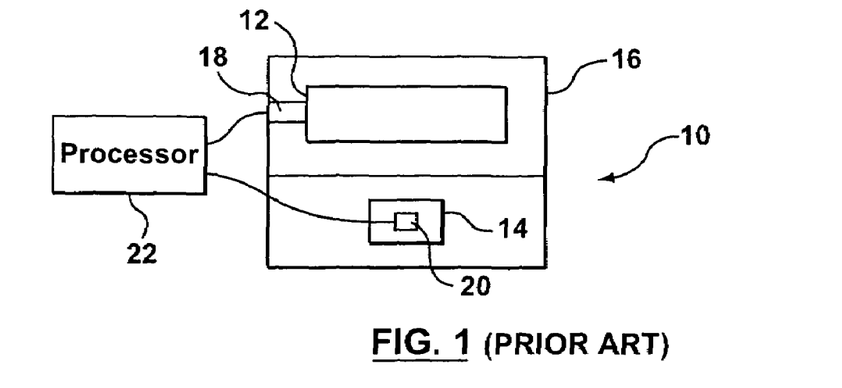
FIG. 1 is a diagrammatic block diagram of a conventional prior art gravity gradiometer.

Reference is first made to FIG. 1, which shows very simply in block diagram form the major components of a typical conventional gravity gradiometer 10. As shown in FIG. 1, gravity gradiometer 10 includes a first quadrupole responder 12, and a second quadrupole responder 14, oriented orthogonally to each other and mounted in a common housing 16. Each quadrupole responder 12, 14 includes a mass quadrupole mounted on a flexural axis (the axes are not shown in FIG. 1). The flexural axes of the two quadrupole responders 12, 14 are co-linear, as shown in U.S. Pat. No. 5,668,315. Sensors 18, 20 (shown in FIG. 1 in one of several possible locations in the two quadrupole responders) detect rotation of the masses in each quadrupole responder and send a signal to a processor 22 which produces sum and difference signals, provides compensation for parameters of the device, and produces an output for interpretation.

Figure 2:
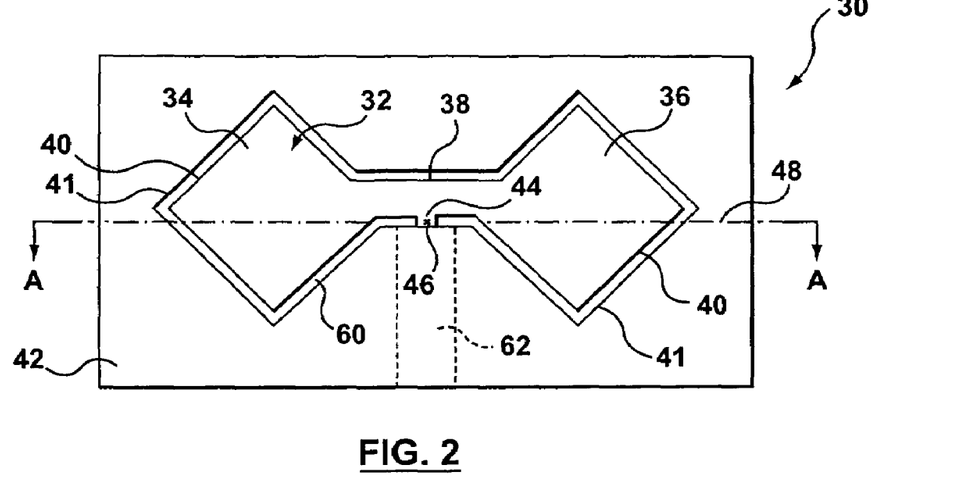
FIG. 2 is a side view of a quadrupole responder according to the invention.
Figure 3:
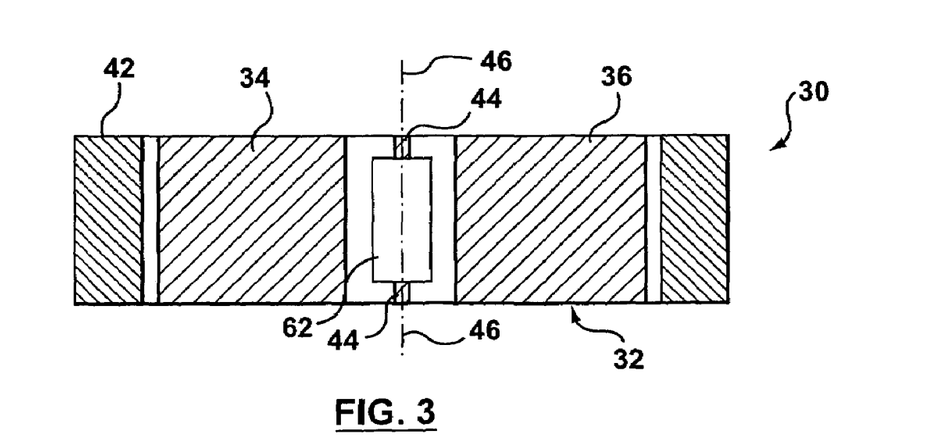
FIG. 3 is a sectional view taken along lines A-A of FIG. 2.
Figure 4:
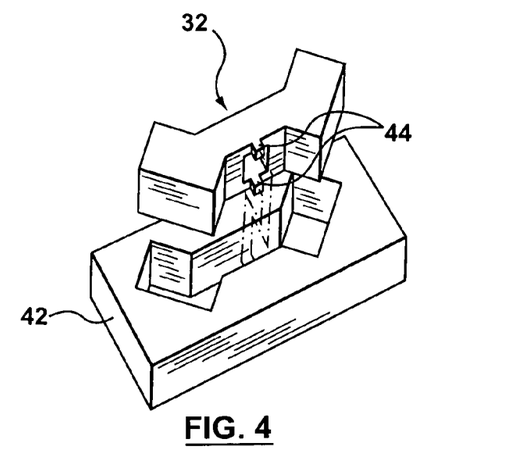
FIG. 4 is an exploded view of the quadrupole responder of FIGS. 2 and 3.

Reference is next made to FIGS. 2 to 4, which show a first embodiment of a quadrupole responder 30 of an OQR-type gravity gradiometer according to the invention. As discussed, a gravity gradiometer would normally include two quadrupole responders 30, 31 (FIG. 5).

As shown in FIGS. 2 to 4, the quadrupole responder 30 includes a bow tie shaped mass quadrupole or balance beam 32, having two enlarged end portions 34, 36 joined by a center portion or bridge 38. The bow tie shape shown is convenient to increase the quadrupole moment of the mass quadrupole or balance beam 32 (thus increasing its response to gravity gradients) and to provide faces 41 on which to mount sensors to detect motion of the quadrupole responder (as will be described).

The mass quadrupole 32 is located in a housing 42 and is supported on the housing by a torsional spring comprising two or more flexure posts 44 (a pair of such posts is shown in FIGS. 3 and 4). Line 46 running through the center of flexure of each of the flexure posts 44 defines the axis of rotation, also known as the sensing axis, for the quadrupole responder 30 (and also for quadrupole responder 31). Line 48 defines a line that is the long axis of the mass quadrupole 32. Axis 48 is perpendicular to the sensing axis 46, and is also orthogonal to the long axis 50 of the second mass quadrupole 54 (FIG. 5).

Figure 5:
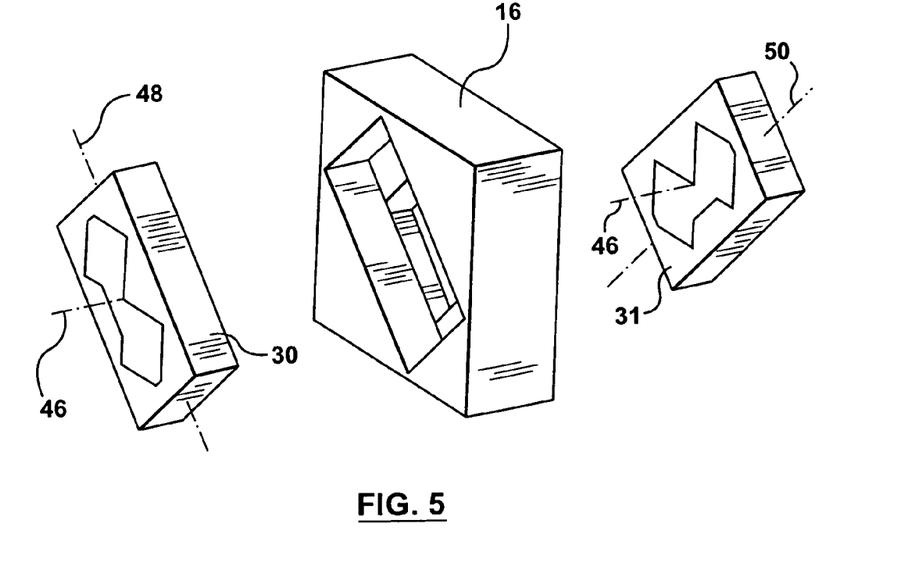
FIG. 5 is an exploded view of a gravity gradiometer comprising two quadrupole responders of the kind shown in FIGS. 2 to 4.

As shown in FIG. 5, two such quadrupole responders 30, 31, mounted with their sensing axes 46 co-linear and their long axes 48, 50 orthogonal to each other, constitute the mechanical elements of an orthogonal quadrupole responder (OQR) class of gravity gradiometer, as described in the prior art (e.g. U.S. Pat. Nos. 5,505,500 and 5,668,315, and the 2004 paper by Moody and Paik).

The mass quadrupole or balance beam 32 and housing 42 are conveniently cut from a solid block of material, by cutting the gap 60 shown in FIG. 2 by a method such as electrical discharge machining (EDM) (a known technique). While a bow tie shape is shown for mass quadrupole 32, the bow tie shape is not a necessity. Other shapes may also be used for the mass quadrupole 32, so long as the center of mass of the mass quadrupole or balance beam 32 lies sufficiently close to the sensing axis or axis of rotation 46, and so long as the resulting shape has a sufficiently high mass quadrupole moment. In addition, the chosen shape should provide suitably placed and oriented surfaces (such as surfaces 41, FIG. 2) on which to mount sensors to measure rotation of mass quadrupole 32 about the sensing axis 46. For example, for non-cryogenic temperature operation, sensor elements such as capacitor plates (not shown) can be mounted on surfaces 40 of the mass quadrupole 32 and on the housing surfaces 41 opposite surfaces 40, to detect small movements of the mass quadrupole 32 (as shown in Pike et al. U.S. Pat. No. 6,776,042). Induction coils could be used in the same locations instead of capacitor plates. Optical deflection sensing means such as interferometers could instead be used, with optical elements installed on the housing surfaces 41 reflecting light beams from mirror surfaces on the opposite surfaces 40.

As described in the prior art (U.S. Pat. Nos. 5,505,500 and 5,668,315, and the 2004 paper by Moody and Paik), in an OQR gravity gradiometer intended for cryogenic-temperature operation, the whole mass quadrupole 32 and housing 42 may be made from a monoblock of niobium, which assists greatly in maintaining the extreme dimensional stability required. The use of niobium also provides a superconducting property (the Meissner effect) which allows a system of pancake coils and SQUID sensors to be used as very sensitive gap-size sensors, as described in M. V. Moody, H. A. Chan and H. J. Paik, "Preliminary tests of a newly developed superconducting gravity gradiometer", *IEEE Transactions on Magnetics*, MAG-19, No. 3, May 1983, pp. 461-464. For operation at non-cryogenic temperatures, other types of sensors would be used, as described above; in that case, the block may be formed using a non-superconducting material.

A pair of flexure posts 44 are conveniently made by first forming a slot 62, part-way through the housing 42 as shown in FIGS. 2, 3, using a manufacturing technique such as (but not limited to) milling, boring or casting. (In another embodiment, a number of posts larger than two can be made by forming more than one slot such as 62, with the slots spaced suitably to leave material in place between them.)

During the EDM process, the gap 60 formed by EDM is not cut completely around the mass quadrupole or balance beam 32, thus leaving in place and forming the flexure posts 44 from the remaining material. This contrasts from the prior art, which did not have a slot 62 and hence left a web extending completely across the housing 42. It is known that the EDM process can produce surface damage on a microscale which can compromise the elastic behavior of the flexure and may further not produce the final desired measurement tolerance. A remedy for this is to EDM the flexure so that its thickness is slightly oversize, followed by removal of the damaged surface layer by an appropriate process such as microscale polishing, atom or ion beam milling, or chemical or electrochemical etching, ending with the flexure having the desired thickness dimension and microstructural form.

The resonant frequency of the quadrupole responders 30, 31 is a fundamental design parameter, and varies as the square root of the torsional stiffness of the flexures about the sensing axis 46, which in turn varies as the length of the flexure (across the balance beam 32) and, approximately as its thickness cubed. Thus, the posts 44 must be considerably thicker than the web used in prior art designs, to achieve the same resonant frequency as in those prior designs.

A disadvantage of the prior art web design, as found by the inventors of the prior art and others, is that it is difficult, with present state-of-the-art machining techniques such as EDM, to maintain a uniform precisely controlled thickness in a web of microscopic thickness, especially towards the middle section of the web. This difficulty is much less with the present invention, since the material between the flexure posts 44, which would otherwise be the center section of a web, is in this case removed by forming the slot 62. This leads to better control of the resonant frequency of the quadrupole responder as manufactured. It is noted that it is desirable to match the resonant frequencies of the two quadrupole responders in an OQR-type gravity gradiometer as closely as possible, in order to reduce sensitivity of the difference-mode output signal of the gravity gradiometer to angular accelerations about the sensing axis 46. Hence the improved ability to control each quadrupole responder's resonant frequency is advantageous because it can ease the process of matching resonant frequencies between pairs of quadrupole responders.

It is apparent that a first quadrupole responder built using flexure posts 44, in which the stiffening effect of the flexure material is concentrated at the two edges of the mass quadrupole, will be more resistant to twisting deflections (out of the plane of the drawing in FIG. 2) than will a second quadrupole responder that employs a thinner web flexure extending the entire width of the mass quadrupole, in which the central regions provide little restraint against twisting, in the case where the flexures of the first and second quadrupole responders both have identical values of stiffness against rotation about the sensing axis. The gradiometer in an aircraft will of course be subjected to every orientation of rotational motion, and so the present flexure-post design will result in less undesirable rotational motion of the quadrupole responders in this out-of-plane direction. One virtue of the web flexure OQR gravity gradiometer is that the web flexure suspension provides considerable stiffness resisting all motions except rotation of the quadrupole responder about the sensing axis (this in contrast with, for example, magnetic suspensions). Thus, the use of posts as the torsional spring or flexure enhances one of the OQR's virtues.

Exemplary dimensions for flexure posts 44 are as follows: posts 44 are rectangular and are nominally 0.33 mm high, 0.45 mm thick (along long axis 48) and 0.46 mm wide (along the sensing axis 46). Of course, various other dimensions, and curved faces, can be used to achieve the requisite stiffness and to reduce stress concentrations at sharp corners. As mentioned, while two posts are shown, three or even more could be used (spaced along sensing axis 46).

In another aspect (embodiment) of this invention, a preferred set of materials for fabricating at least the flexural regions of quadrupole responders will be described, which may overcome a major difficulty in achieving the performance goal of 1 Eo detection measured once per second with a gradiometer operating at non-cryogenic temperatures including standard room temperature.

The inventors have determined that a class of materials known variously as metallic glasses, amorphous metal, glassy metals, glassy metal alloys, metallic glass alloys, or bulk metallic glasses can be used to form the flexure of a quadrupole responder and in doing so provide major advantages. (All the foregoing terms are equivalent as used herein and all of the terms as used herein refer to amorphous materials. For simplicity, the terms glassy metals or metallic glasses will primarily be used.) One of the obstacles to achieving non-cryogenic temperature operation of an OQR type gravity gradiometer is that the flexures of the quadrupole responders must be made of a material with a very low internal loss coefficient, in order to avoid excessive hysteresis and creep caused by effects including crystal-structure dislocation movement and grain boundary slippage, which in turn result in poor instrument response repeatability. Another such obstacle is that the very thin flexure element of the quadrupole responder requires it to be made of a very high strength material with a high elastic limit, to resist the loads and deflections caused by gravity and motion on the mass quadrupole without yielding or breaking.

Many common polycrystalline metals such as steel have sufficiently high strength for this application, but have internal loss coefficients that are too high. Ordinary glasses and fused quartz have sufficiently low loss coefficients, but have insufficiently high strength (see FIG. 3, Ashby and Greer). Certain classes of metallic glasses (see for example the Zn, Ti, Ni, Cu alloy family in FIG. 2, Ashby and Greer, *Scripta Materialia*, Volume 54, Issue 3 (2006) pp. 321-326, Elsevier) have loss coefficients 2 to 3 orders of magnitude lower than steel, and are thus almost perfectly elastic up to their breaking point. In addition, such metallic glasses have high strength compared to metals such as steel. These metallic glasses can thus overcome both the stated obstacles.

Nanocrystalline materials may also be used. These are materials in which the crystal grain size is approximately one to three nanometers, so that there is no long range structural order.

Generally, a metallic glass may be used consisting essentially of a material of one of the following general compositions:

(i) $A_x Z_t$ where "A" is one or a plurality of members selected from the group consisting of IVb, Vb, VIb and VIII of the Periodic Table; "Z" is one or a plurality of members selected from the group consisting of a metalloid element from the group IIIa, IVa, Va, and VIa of the Periodic Table, and wherein "x" and "t" are atomic percents. Preferably, "Z" is or includes at least one member selected from the group consisting of silicon, phosphorus, carbon and boron. "t" should not be greater than "x".

(ii) $A_x B_y$ where "A" is one or a plurality of members selected from the group consisting of IVb, Vb, VIb and VII of the Periodic Table and preferably is a transition metal; "B" is one or a plurality of members selected from the group consisting of elements from the group IIa, Ib, IIb, IIIb, IVb, Vb, VIb and VIIb of the Periodic Table, and wherein "x" and "y" are atomic percents. Preferably, "B" is or includes at least one member selected from the group consisting of refractory or alkali earth metals.

In either of the above groups, there can be two, three, four, five or more elements in the alloy used. To obtain the required disorder, a variety of elements having atoms of different sizes can be mixed together to promote a lack of long range internal structure. Some of these atoms can include iron, so long as the proportion of iron is low so there are no appreciable ferromagnetic properties of the resultant alloy. Ferromagnetism is an undesirable property, as it would impose unwanted forces and torque on the mass quadrupole due to interactions with the earth's magnetic field.

The metallic glass or nanocrystalline material used should preferably have certain physical and chemical characteristics. For example, it should have very low hysteresis, i.e. low internal damping, in the temperature range of operation. The temperature range of operation should preferably include room temperature (about 18° C. to 25° C.), and should preferably include temperatures up to about 60° C. and down to about −270° C. if possible. The material should also have a high elastic limit, which will typically be four to five times the elastic limit of conventional materials such as niobium or steel. It should also be strong, with a strength similar to or higher than that of high-strength steel, so that quadrupole responder flexures made of such a material will not fatigue or fracture during fabrication, handling or operation.

In addition, the material selected should not have any significant ferromagnetic properties. It would also be desirable, depending on the fabrication method selected, for the material to be fusion bondable. The material should preferably also be capable of being cast and machined.

Preferably, the glassy metal or nanocrystalline material selected should have a maximum elastic deflection of at least about two percent at the temperature at which it is used. (The maximum elastic deflection for niobium at 20 degrees K is approximately 1.2 percent.)

In addition, the elastic limit for the material used should preferably be at least about 2000 MPa at the temperature at which it is used (the elastic limit for niobium at 20 degrees K is about 1150 MPa).

The loss coefficient for the material should be as low as possible, in order to minimize hysteresis in a quadrupole responder's rotational motion about its sensing axis. For example, the loss coefficient for steel is $10^{-4}$, which is too high for use in a gravity gradiometer able to achieve a performance level of 1 Eo averaged once per second. Preferably, the glassy metals or nanocrystalline materials used according to the invention should have a loss coefficient of about $10^{-6}$ or less at the temperature of use (including room temperature).

Figure 5A:
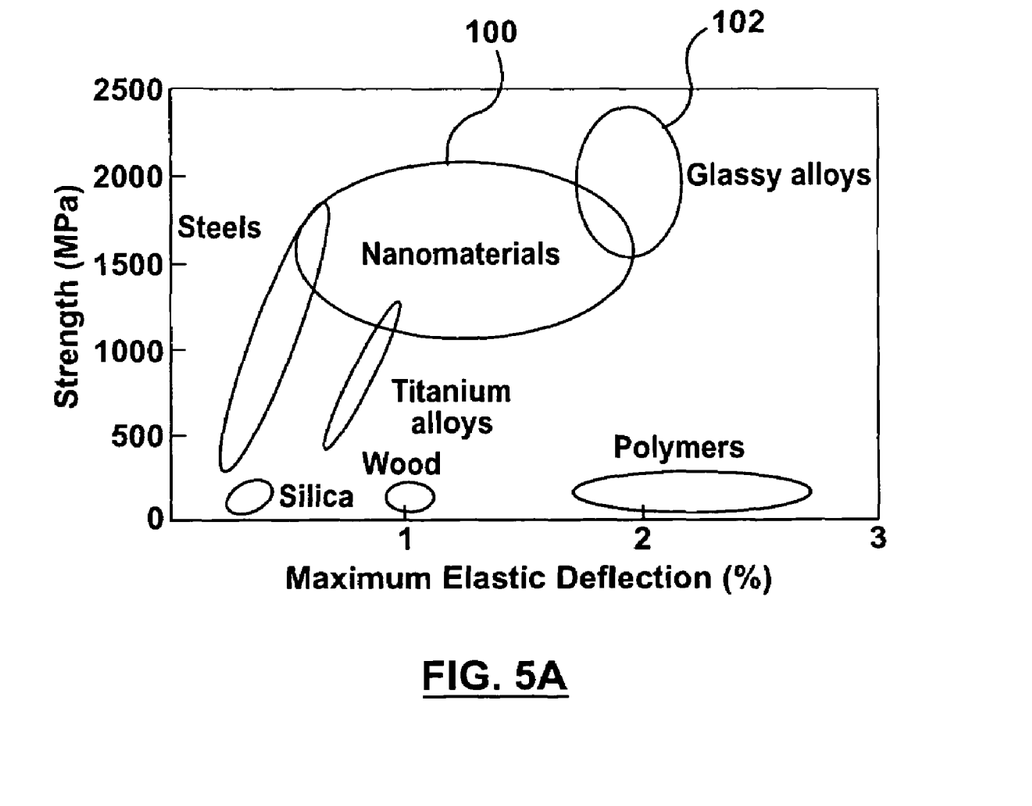
FIG. 5A is a schematic diagram of strength versus maximum elastic deflection for several classes of materials.

FIG. 5A is a plot of strength (in megapascals) on the vertical axis versus maximum elastic deflection (in percent) on the horizontal axis, for various materials. It will be seen from FIG. 5A that nanocrystalline materials 100 have a tensile strength approximately similar to that of steels but have much higher maximum elastic deflections. Glassy metals 102 (also referred to as glassy alloys in FIG. 5A) can have slightly more strength than nanocrystalline materials and typically have a higher maximum elastic deflection (which far exceeds that of steel).

The following is a list of glassy metal alloy families which, so long as the proportions of each element are chosen so that the resultant alloy is amorphous, would be useful in making the flexure of a quadrupole responder:

Mg-LN-(Ni, Cu, Zn) Note that LN is an abbreviation of the family of elements known as lanthanides or rare earths comprised of the elements (La, Ce, Pr, Nd, Pm, Sm, Eu, Gd, Tb, Dy, Ho, Er, Tm, Yb and Lu).

Mg-LN-(Ni, Cu, Zn)—(Ag, Pd)

Ln-Al-TM

Ln-Y—Al-TM Note that TM is an abbreviation of the family of elements known as transition metals comprised of the elements from Group IIIB through Group IIB of the periodic table.

Ti—(Zr, Hf)-TM

Ti—Zr-TM-Be

Ti—Zr-TM-Al—Si—B

Ti—Ni—Cu—Sn

Ti—Ni—Cu—Sn—Be

Zr—Al-TM

Zr—(Ti, Nb)-TM-Be

Zr—Al—(Ti, Nb)-TM-Be

Zr—(Ti, Nb, Pd)—Al-TM (Hf, Zr)—Ti—(Al, Ga)-TM

Au—Cu—Si—(Ag, Pd)

Pt-TM-P

Cu—(Zr, Hf, Nb)—Ti

Cu—(Zr, Hf, Nb)—Ti—Ta

Cu—(Zr, Hf)—Ti—(Y, Be)

Cu—(Zr, Hf, Nb)—Ti-TM

Cu—(Zr, Hf)—(Al, Ga)

Cu—(Zr, Hf)—Ti—(Ag, Au, Pd, Pt)

Cu—(Zr, Hf)—Ti—Al—(Ag, Au, Pd, Pt)

Cu—(Zr, Hf)

Pd-TM-P

Pd—Cu—Si

Pd—Cu—Si—P

Ca—Mg—(Ni, Cu, Zn)

Ca—Al—Mg—(Ni, Cu, Zn)

(Y, Sc)—Al-TM

Of the glassy metal alloy families listed above, the following are believed to be particularly desirable from the viewpoint of desired structural properties:

Cu—Zr—Ti—Ta

Cu—Zr—Ti-TM

Ti—Ni—Cu—Sn

Zr—Al-TM

Hf—Zr—Ti—Al-TM

In the above families, the following specific glassy metal alloy formulations are believed to be useful in forming the flexures of quadrupole responders, with properties such as the ability to function well over a wide range of temperatures (as low as cryogenic temperature and as high as room temperature), and also enough robustness to be able to withstand handling, transport and operation over that range of temperatures:

Cu—Zr—Ti—Ta (3 alloys):

$(Cu_{0.6}Zr_{0.3}Ti_{0.1})_{99}Ta_1$ $(Cu_{0.6}Zr_{0.3}Ti_{0.1})_{98}Ta_2$ $(Cu_{0.6}Zr_{0.3}Ti_{0.1})_{97}Ta_3$

Cu—Zr—Ti-TM (3 alloys):

$Cu_{47}Ti_{34}Zr_{11}Ni_8$ $Cu_{47}Ti_{33}Zr_{11}Ni_8Fe_1$ $Cu_{54}Zr_{22}Ti_{18}Ni_6$

Ti—Ni—Cu—Sn (2 alloys):

$Ti_{50}Cu_{25}Ni_{20}Sn_5$ $Ti_{50}Cu_{23}Ni_{20}Sn_7$

Zr—Al-TM (1 alloy):
$Zr_{55}Co_{25}Al_{20}$
Hf—Zr—Ti—Al-TM (1 alloy):
$Hf_{50}Cu_{30}Ni_{10}Al_{10}$ In the above formulations, and in those listed below, the numerical subscripts refer to atomic percentages, i.e. the percentages of the number of atoms of each element in the formulation.

A further specific glassy metal formulation which the inventors also believe is particularly suitable for forming flexural posts 44 or other quadrupole responder flexures is: $Cu_{43}$—$Zr_{43}$—$Al_7$—$Ag_7$.

The above specific formulations are exemplary only, since as discussed above, it will be realized that numerous other glassy metal formulations may also be used, depending on the material properties desired for the application in question.

The combination of the properties of high elastic limit, high strength and low loss coefficient makes these glassy metals highly suitable for use in the flexure of a quadrupole responder for a gravity gradiometer.

For this second embodiment of the invention involving the use of glassy metal materials for the flexures of quadrupole responders, there are several well-known manufacturing processes that are available for making such flexures and quadrupole responder structures using glassy metals. In one of these techniques (direct casting), a mould is made which is a matrix for the final part (that is, whose internal cavity has the desired shape of the final part). This mould is placed in a quench medium (e.g. anti-freeze containing dry ice). The constituent elements of the selected glassy metal are placed in a receptacle, such as a crucible or a sealed quartz chamber, and heated to a temperature above the liquidus of the glassy metal. The molten glassy metal is then injected or allowed to flow from the receptacle into the mould; the quench medium surrounding the mould causes sufficiently rapid cooling to produce a glassy metal structure of the desired shape in a bulk form.

However in practice, the size of a part that can be manufactured from any particular glassy metal using this direct casting technique is limited. Conventional glassy metals are created by cooling molten alloys fast enough so that crystallization is prevented and a solid material with an amorphous atomic structure is obtained. Thus, a glassy metal is a solid material possessing no long range structural order, but instead having short range chemical ordering with the atomic properties of a liquid/metal. However, if a glassy metal is made by direct casting, and if the material is not cooled fast enough, it will crystallize and will then no longer have the structure or the advantages of a glassy metal. The minimum cooling rate which will result in successful glassy metal formation is a quantity that varies between specific glassy metal formulations. Since the cooling rate is slower for larger cast pieces, for any particular glassy metal formulation there is a maximum characteristic dimension above which direct casting will not successfully result in uniform glassy metal properties throughout the cast piece.

In another well-known technique (superplastic forming), the desired part is formed by first preparing a quantity of bulk glassy metal material using a technique such as direct casting, then placing that glassy metal in a receptacle which is connected via an aperture to a die which forms a matrix for the desired final part. The temperature of the receptacle is then increased to a temperature that is between the glass transition temperature and the crystallization temperature of the metallic glass, so that the metallic glass material forms a liquid. This liquid is usually of high viscosity. The size of the aperture and the size and shape of the cavities within the die must be designed so that the viscous liquid is able to be forced into the die under pressure before solidifying. Pressure is then applied to the material in the receptacle, for example using opposed plungers, so that the glassy metal material in the receptacle will flow from the receptacle into the die. Once it is filled with the glassy metal material, the die containing the formed part is quickly cooled, following which the formed part is removed.

For some choices of glassy metal material, and for some quadrupole responder designs, it may be feasible and advantageous to form the quadrupole responder using the superplastic forming technique. In that case, a quadrupole responder with its mass quadrupole, its flexure and its housing may be thus formed as a single contiguous structure from the glassy metal material, with a geometry such as that shown in FIGS. 2, 3 and 4 (in the case that the flexure is to comprise several posts). Similarly, the quadrupole responder may be so formed with a geometry such as that disclosed in U.S. Pat. No. 5,668,315, including a web-shaped flexure, but using a glassy metal material rather than the superconducting niobium material described in that patent.

For other glassy metal materials or for other quadrupole responder designs, in which it is not feasible or convenient to use superplastic forming to inject the glassy metal material into a die to form the quadrupole responder, superplastic forming can be combined with other processes directly such as diffusion bonding to form the quadrupole responder assembly, or an alternate fabrication approach can be used as described below.

Figure 6:
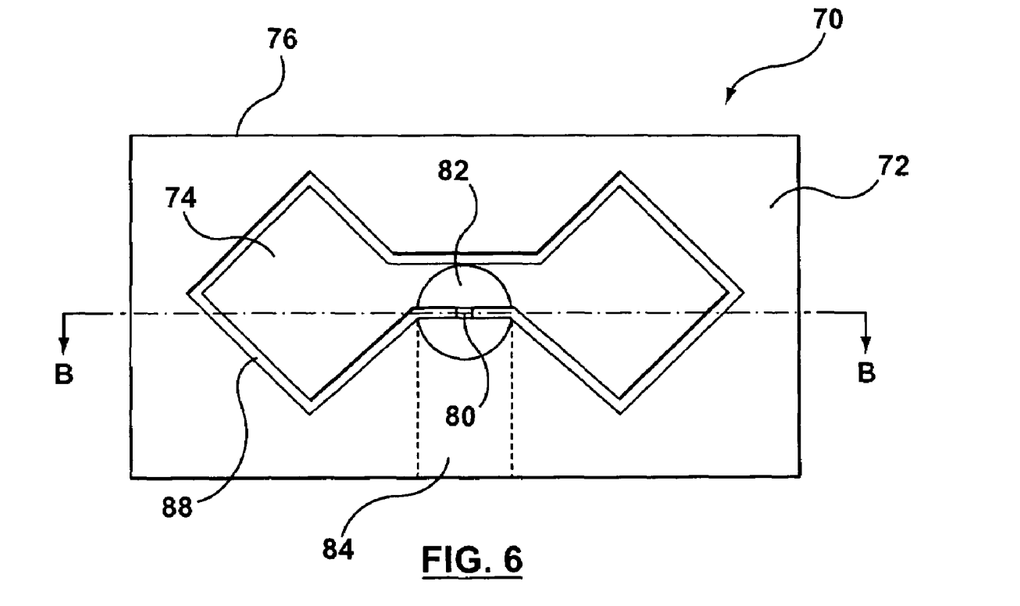
FIG. 6 is a side view of a modified quadrupole responder according to the invention.
Figure 7:
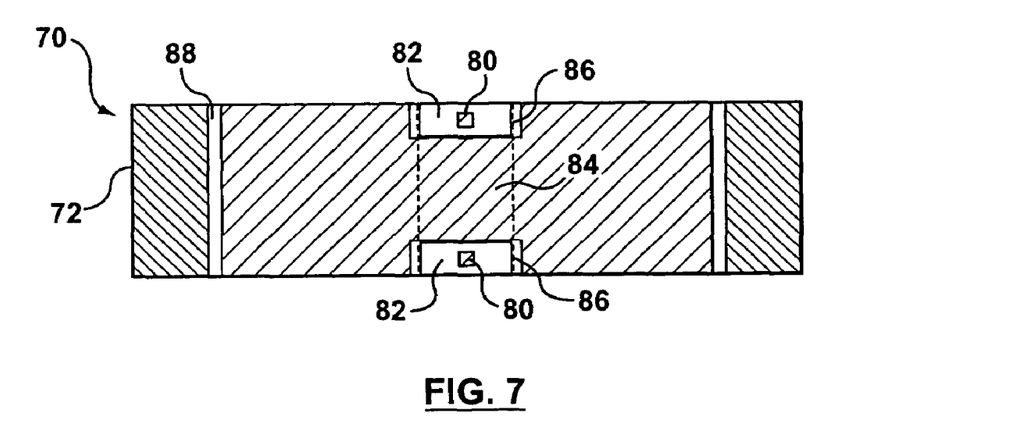
FIG. 7 is a sectional view taken along lines B-B of FIG. 6.

Reference is next made to FIGS. 6 and 7, which show a quadrupole responder assembly 70. As in FIGS. 2 to 5, in one embodiment the responder 70 includes a monoblock 72 of annealed metal, which need not be a glassy metal, comprising a bow tie shaped balance beam or mass quadrupole 74 and a housing 76. (As before, shapes other than a bow tie shape may be used instead, as long as the balance beam possesses a sufficient quadrupole mass moment.) A gap 88 between the balance beam 74 and the housing 76 will then be formed by a technique such as electric discharge machining, as before, except that in this case the gap 88 extends around the entire periphery of the balance beam 74. In another embodiment, the balance beam 74 and the housing 76 may first be fabricated as completely separate pieces which are later connected together, in which case the balance beam 74 may be made from a material different from that of the housing 76.

Figure 8:
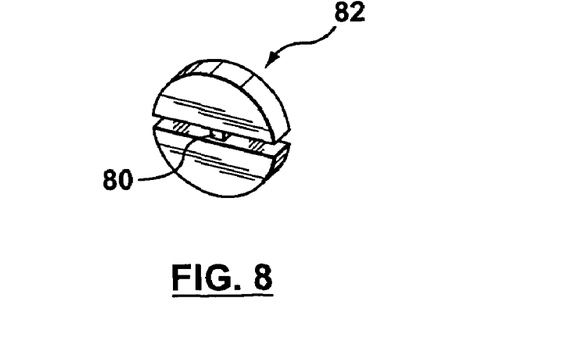
FIG. 8 is a perspective view showing a disc containing a flexural post of the kind used in the FIGS. 6 and 7 quadrupole responder.

The balance beam 74 is connected to the housing 76 by a pair of glassy metal flexure posts 80. Each post 80 is formed as part of a glassy metal disc 82 (FIG. 8). The size of the discs 82 is chosen to be small enough that the discs can be formed from the glassy metal material by direct casting. In this fabrication approach, the glassy metal used to form the discs 82 need not be the same material as that used to form the balance beam 74 or the housing 76.

In the manufacturing process, and as before, a slot 84 will be milled or otherwise formed in monoblock 72. In addition, side recesses 86 will be formed (by milling or some other suitable process as described above) in the sides of the block 72 to receive the discs 82.

While the gap 88 is being formed, and until the discs 82 are inserted, the balance beam 74 and housing 76 are separately supported in fixed relationship, by temporary supports (not shown). In one embodiment, the discs 82 are then inserted into the side recesses 86 with a tight fit and are then subjected to heat to diffusion bond the discs 82 to the housing 76 and to the balance beam 74. Other embodiments using other forms of bonding (such as the use of welding, adhesives or mechanical fasteners) may alternately be formed. The bonding technique used is chosen to be compatible with the materials of the discs 82, the balance beam 74 and the housing 76.

After the bonding is completed, the temporary supports are removed and the balance beam 74 is left supported on the housing 76 by the posts 80.

As described earlier in this document, it is expected that quadrupole responders having glassy metal flexures according to the invention will commonly be operated at about room temperature. Room temperature normally means about 18° C. to 25° C., but typically the instrument will be flown in an aircraft, and its temperature will be carefully regulated (i.e. the temperature will not be permitted to vary appreciably). The temperature may be regulated at 40° C. to 70° C., or it may be regulated at 0° C. or even −20° C. (for example). All these temperatures are intended to be included in the term "about room temperature" (as contrasted with cryogenic temperatures, which are much lower).

In some cases, quadrupole responders having glassy metal flexures according to the invention may be used at cryogenic temperatures, to take advantage of superconduction which can be achieved at cryogenic temperatures, in order to utilize sensors which require superconduction. At the present time, there are two main classes of superconducting materials. Materials in the first class, which include niobium and lead, superconduct at about the temperature of liquid helium, which boils at a temperature of 4.2° K. at one atmosphere pressure.

Materials in the second class comprise combinations of elemental materials to form superconducting ceramic compositions, such as combinations of yttrium, barium and copper oxide (commonly referred to as YBCO) which superconduct at the temperature of liquid nitrogen which boils at a temperature of 77.4° K at one atmosphere pressure. Either of these classes of superconducting materials can be used in sensor construction for quadrupole responders according to the invention. Therefore, the term "cryogenic temperatures" as used in the description and claims of this document is intended to refer to the temperature at which these and other common atmospheric gases cooled to liquid phase, boil at one atmosphere pressure. The glassy metal used to make quadrupole responder flexures which are to operate at these cryogenic temperatures should as mentioned previously have a maximum elastic deflection of at least about 2%, an elastic limit of at least about 2000 MPa, and a loss coefficient of about $10^{-6}$ or less at these cryogenic temperatures, if they are to be used at cryogenic temperatures.

While preferred embodiments of the invention and fabrication methods have been described, it will be realized that various changes can be made to these.

The invention claimed is:

1. A quadrupole responder for an OQR type gravity gradiometer comprising:
   a) a housing;
   b) a mass quadrupole positioned within the housing and having a center of mass;
   c) a torsional spring comprising a flexure attaching said mass quadrupole to said housing and allowing rotation of the mass quadrupole about said center of mass;
   d) the flexure comprising at least two spaced apart posts.

2. A quadrupole responder according to claim 1 wherein there are no more than two said posts.

3. A quadrupole responder according to claim 1 wherein said posts are formed of a material which is a glassy metal or a nanocrystalline material.

4. A quadrupole responder according to claim 3 wherein said material has a maximum elastic deflection of at least about 2% at about room temperature.

5. A quadrupole responder according to claim 3 wherein said material has an elastic limit of at least about 2000 MPa at about room temperature.

6. A quadrupole responder according to claim 3 wherein said material has a loss coefficient not greater than about $10^{-6}$ at about room temperature.

7. A quadrupole responder according to claim 3 wherein said material has a maximum elastic deflection of at least about 2%, an elastic limit of at least about 2000 MPa, and a loss coefficient not greater than about $10^{-6}$, all at about room temperature.

8. The apparatus of claim 4 wherein there are two of said quadrupole responder forming a gravity gradiometer.

9. A quadrupole responder for an OQR type gravity gradiometer comprising:
   a) a housing;
   b) a mass quadrupole positioned within the housing and having a center of mass;
   c) a torsional spring comprising a flexure attaching said mass quadrupole to said housing and allowing rotation of the mass quadrupole about said center of mass;
   d) said flexure being formed of a material which is a glassy metal or a nanocrystalline material such that the flexure will undergo low loss elastic deformation during said rotation.

10. A quadrupole responder according to claim 9 wherein said material has a maximum elastic deflection of at least about 2% at about room temperature.

11. A quadrupole responder according to claim 9 wherein said material has an elastic limit of at least about 2000 MPa at about room temperature.

12. A quadrupole responder according to claim 9 wherein said material has a loss coefficient not greater than about $10^{-6}$ at about room temperature.

13. A quadrupole responder according to claim 9 wherein said material has a maximum elastic deflection of at least about 2%, an elastic limit of at least about 2000 MPa, and a loss coefficient not greater than about $10^{-6}$, all at about room temperature.

14. A quadrupole responder according to claim 9 wherein said flexure comprises at least two spaced apart posts.

15. A quadrupole responder according to claim 9 wherein said flexure comprises not more than two spaced apart posts.

16. A quadrupole responder according to claim 9 wherein said flexure comprises a web.

17. A quadrupole responder according to claim 9 wherein said glassy metal is selected from the group comprising:
   (i) $A_x Z_t$ where "A" is one or a plurality of members selected from the group consisting of IVb, Vb, VIb and VIII of the Periodic Table; "Z" is one or a plurality of members selected from the group consisting of a metalloid element from the group IIIa, IVa, Va, and VIa of the Periodic Table, and wherein "x" and "t" are atomic percents,
   (ii) $A_x B_y$ where "A" is one or a plurality of members selected from the group consisting of IVb, Vb, VIb and VIII of the Periodic Table; "B" is one or a plurality of members selected from the group consisting of elements from the group IIa, Ib, IIb, IIIb, IVb, Vb, VIb and VIIb of the Periodic Table, and wherein "x" and "y" are atomic percents.

18. A quadrupole responder according to claim 17 wherein "Z" is at least one member selected from the group consisting of silicon, phosphorus, carbon and boron.

19. A quadrupole responder according to claim 18 wherein "B" is at least one member selected from the group consisting of refractory or alkali earth metals.

20. A quadrupole responder according to claim 9 wherein said glassy metal is selected from the following glassy metal alloy families:
Mg-LN-(Ni, Cu, Zn)
Mg-LN-(Ni, Cu, Zn)—(Ag, Pd)
Ln-Al-TM
Ln-Y—Al-TM
Ti—(Zr, Hf)-TM
Ti—Zr-TM-Be
Ti—Zr-TM-Al—Si—B
Ti—Ni—Cu—Sn
Ti—Ni—Cu—Sn—Be
Zr—Al-TM
Zr—(Ti, Nb)-TM-Be
Zr—Al—(Ti, Nb)-TM-Be
Zr—(Ti, Nb, Pd)—Al-TM
(Hf, Zr)—Ti—(Al, Ga)-TM
Au—Cu—Si—(Ag, Pd)
Pt-TM-P
Cu—(Zr, Hf, Nb)—Ti
Cu—(Zr, Hf, Nb)—Ti—Ta
Cu—(Zr, Hf)—Ti—(Y, Be)
Cu—(Zr, Hf, Nb)—Ti-TM
Cu—(Zr, Hf)—(Al, Ga)
Cu—(Zr, Hf)—Ti—(Ag, Au, Pd, Pt)
Cu—(Zr, Hf)—Ti—Al—(Ag, Au, Pd, Pt)
Cu—(Zr, Hf)
Pd-TM-P
Pd—Cu—Si
Pd—Cu—Si—P
Ca—Mg—(Ni, Cu, Zn)
Ca—Al—Mg—(Ni, Cu, Zn)
(Y, Sc)—Al-TM
wherein the symbol TM is an abbreviation meaning the family of elements known as transition metals and comprised of the elements from Group IIIB through Group IIB of the Periodic Table.

21. A quadrupole responder according to claim 9 wherein said glassy metal is selected from the following glassy metal alloy families:
Cu—Zr—Ti—Ta
Cu—Zr—Ti-TM
Ti—Ni—Cu—Sn
Zr—Al-TM
Hf—Zr—Ti—Al-TM
wherein the symbol TM is an abbreviation meaning the family of elements known as transition metals and comprised of the elements from Group IIIB through Group IIB of the Periodic Table.

22. A quadrupole responder according to claim 9 wherein said glassy metal includes: Cu, Zr, Ti, and Ta.

23. A quadrupole responder according to claim 22 wherein said glassy metal comprises substantially the following formulation, where the numbers refer to the atomic percentage of each element: $(Cu_{0.6}—Zr_{0.3}—Ti_{0.1})_{99}Ta_1$.

24. A quadrupole responder according to claim 22 wherein said glassy metal comprises substantially the following formulation, where the numbers refer to the atomic percentage of each element: $(Cu_{0.6}—Zr_{0.3}—Ti_{0.1})_{98}Ta_2$.

25. A quadrupole responder according to claim 22 wherein said glassy metal comprises substantially the following formulation, where the numbers refer to the atomic percentage of each element: $(Cu_{0.6}—Zr_{0.3}—Ti_{0.1})_{97}Ta_3$.

26. A quadrupole responder according to claim 9 wherein said glassy metal includes: Cu, Zr, Ti, and TM, wherein the symbol TM is an abbreviation meaning the family of elements known as transition metals and comprised of the elements from Group IIIB through Group IIB of the Periodic Table.

27. A quadrupole responder according to claim 26 wherein said glassy metal comprises substantially the following formulation, where the numbers refer to the atomic percentage of each element: $Cu_{47}—Ti_{34}—Zr_{11}—Ni_8$, the element Ni being one of said transition metals.

28. A quadrupole responder according to claim 26 wherein said glassy metal comprises substantially the following formulation, where the numbers refer to the atomic percentage of each element: $Cu_{47}—Ti_{33}—Zr_{11}—Ni_8—Fe_1$, the elements Ni and Fe being members of said family of elements known as transition metals.

29. A quadrupole responder according to claim 26 wherein said glassy metal comprises substantially the following formulation, where the numbers refer to the atomic percentage of each element: $(Cu_{54}—Zr_{22}—Ti_{18})—Ni_6$, the element Ni being a member of the family of elements known as transition metals.

30. A quadrupole responder according to claim 9 wherein said glassy metal includes: Ti, Ni, Cu, Sn.

31. A quadrupole responder according to claim 30 wherein said glassy metal comprises substantially the following formulation, where the numbers refer to the atomic percentage of each element: $Ti_{50}—Cu_{25}—Ni_{20}—Sn_5$.

32. A quadrupole responder according to claim 30 wherein said glassy metal comprises substantially the following formulation, where the numbers refer to the atomic percentage of each element: $Ti_{50}—Cu_{23}—Ni_{20}Sn_7$.

33. A quadrupole responder according to claim 9 wherein said glassy metal includes: Zr, Al, and TM, wherein the symbol TM is an abbreviation meaning the family of elements known as transition metals and comprised of the elements from Group IIIB through Group IIB of the Periodic Table.

34. A quadrupole responder according to claim 33 wherein said glassy metal comprises substantially the following formulation, where the numbers refer to the atomic percentage of each element: $Zr_{55}—Co_{25}—Al_{20}$, wherein Co is a member of said family of elements known as transition metals.

35. A quadrupole responder according to claim 9 wherein said glassy metal includes: Hf, Zr, Ti, Al, and TM, wherein the symbol TM is an abbreviation meaning the family of elements known as transition metals and comprised of the elements from Group IIIB through Group IIB of the Periodic Table.

36. A quadrupole responder according to claim 35 wherein said glassy metal comprises substantially the following formulation, where the numbers refer to the atomic percentage of each element: $Hf_{50}—Cu_{30}—Ni_{10}—Al_{10}$, wherein the elements Cu and Ni are members of said family of elements known as transition metals.

37. A quadrupole responder according to claim 9 wherein said glassy metal includes: Cu, Zr, Al, and Ag.

38. A quadrupole responder according to claim 37 wherein said glassy metal comprises substantially the following formulation, where the numbers refer to the atomic percentage of each element: $Cu_{43}—Zr_{43}—Al_7—Ag_7$.

39. A quadrupole responder according to claim 3 wherein said material has a maximum elastic deflection of at least about 2% at a cryogenic temperature.

40. A quadrupole responder according to claim 3 wherein said material has an elastic limit of at least about 2000 MPa at a cryogenic temperature.

41. A quadrupole responder according to claim 3 wherein said material has a loss coefficient not greater than about $10^{-6}$ at a cryogenic temperature.

42. A quadrupole responder according to claim 3 wherein said material has a maximum elastic deflection of at least about 2%, an elastic limit of at least about 2000 MPa, and a loss coefficient not greater than about $10^{-6}$, all at a cryogenic temperature.

43. A quadrupole responder according to claim 9 wherein said material has a maximum elastic deflection of at least about 2% at a cryogenic temperature.

44. A quadrupole responder according to claim 9 wherein said material has an elastic limit of at least about 2000 MPa at a cryogenic temperature.

45. A quadrupole responder according to claim 9 wherein said material has a loss coefficient not greater than about $10^{-6}$ at a cryogenic temperature.

46. A quadrupole responder according to claim 9 wherein said material has a maximum elastic deflection of at least about 2%, an elastic limit of at least about 2000 MPa, and a loss coefficient not greater than about $10^{-6}$, all at a cryogenic temperature.

* * * * *